(12) United States Patent
Lee

(10) Patent No.: US 8,991,947 B2
(45) Date of Patent: Mar. 31, 2015

(54) STORAGE SOLUTIONS USING AIRCRAFT LAVATORIES

(71) Applicant: MAG Aerospace Industries, Inc., Carson, CA (US)

(72) Inventor: Thomas M. Lee, Coto de Caza, CA (US)

(73) Assignee: MAG Aerospace Industries, LLC, Glendale, CA (US)

( * ) Notice: Subject to any disclaimer, the term of this patent is extended or adjusted under 35 U.S.C. 154(b) by 0 days.

(21) Appl. No.: 13/974,084

(22) Filed: Aug. 23, 2013

(65) Prior Publication Data

US 2014/0054416 A1    Feb. 27, 2014

Related U.S. Application Data

(60) Provisional application No. 61/692,394, filed on Aug. 23, 2012.

(51) Int. Cl.
| | |
|---|---|
| *A47B 67/02* | (2006.01) |
| *B64D 47/00* | (2006.01) |
| *B64D 11/00* | (2006.01) |
| *B64D 11/02* | (2006.01) |
| *B64D 11/04* | (2006.01) |

(52) U.S. Cl.
CPC ............ *B64D 47/00* (2013.01); *B64D 11/003* (2013.01); *B64D 11/02* (2013.01); *B64D 11/04* (2013.01); *Y02T 50/46* (2013.01)
USPC ......................................................... 312/242

(58) Field of Classification Search
USPC ............................ 244/118.5, 118.6; 312/242, 312/293.1–293.3, 330.1
See application file for complete search history.

(56) References Cited

U.S. PATENT DOCUMENTS

| | | | | |
|---|---|---|---|---|
| 1,644,716 | A * | 10/1927 | Fain .............................. | 312/240 |
| 4,589,463 | A | 5/1986 | Ryan | |
| 6,007,025 | A * | 12/1999 | Coughren et al. ......... | 244/118.6 |
| 6,079,669 | A * | 6/2000 | Hanay et al. ............... | 244/118.5 |
| 6,615,421 | B2 * | 9/2003 | Itakura ............................. | 4/664 |
| 7,549,606 | B2 * | 6/2009 | Quan ......................... | 244/118.5 |
| 8,662,444 | B2 * | 3/2014 | Tappe et al. ................ | 244/118.5 |
| 2013/0206906 | A1 * | 8/2013 | Burrows et al. ............ | 244/118.5 |

FOREIGN PATENT DOCUMENTS

| | | |
|---|---|---|
| EP | 0850833 A2 | 7/1998 |
| EP | 0867365 A2 | 9/1998 |
| EP | 1209078 A2 | 5/2002 |
| WO | 2011116982 A2 | 9/2011 |

OTHER PUBLICATIONS

International Search Report and Written Opinion dated Nov. 4, 2013 in Application No. PCT/US2013/056307.

* cited by examiner

*Primary Examiner* — Matthew Ing
(74) *Attorney, Agent, or Firm* — Kilpatrick Townsend & Stockton LLP; Dean W. Russell; Kristin M. Crall

(57) ABSTRACT

Embodiments provided relate to systems and methods for using aircraft lavatories as storage when the aircraft is on the ground and during taxi, take-off, and landing, but to also allow the lavatories to be open for use during other aircraft flight times. This is accomplished by providing a slidable unit that is contained within the interior space of the aircraft lavatory in a storage position and that is extended out of the aircraft lavatory space in a lavatory use position.

14 Claims, 4 Drawing Sheets

US 8,991,947 B2

STORAGE SOLUTIONS USING AIRCRAFT LAVATORIES

CROSS REFERENCE TO RELATED APPLICATIONS

This application claims the benefit of U.S. Provisional Application Ser. No. 61/692,394, filed Aug. 23, 2012, titled "Galley Space Saving Solutions," the entire contents of which are hereby incorporated by reference.

FIELD OF THE INVENTION

Embodiments of the present invention relate generally to solutions for storing items in aircraft lavatories when the aircraft is on the ground.

BACKGROUND

There has been an increased goal of identifying and capitalizing on unused space in aircraft. Airliners are most profitable when aircraft space is fully utilized. Thus, finding ways to save space and perhaps fit additional seats in the aircraft is of utmost importance to companies that design aircraft components.

The present inventors have determined that one underutilized space is the aircraft lavatory when the aircraft is on the ground. Not many people use the lavatory during the boarding process, as they typically use the restrooms at the gate prior to boarding. Thus, although the lavatories are generally open for use at this time, they are underused. Moreover, when the aircraft pushes back, all passengers are required to remain seated, and the lavatories are completely closed for use. However, once the aircraft reaches cruising altitude, the lavatories need to be available, and are often at capacity during certain times of the flight (such as after meal service times). The present inventors have nonetheless created new ways to use the aircraft lavatories for storage.

BRIEF SUMMARY

Embodiments of the invention described herein thus provide systems and methods for using aircraft lavatories as storage when the aircraft is on the ground and during taxi, take-off, and landing, but to also allow the lavatories to be open for use during other aircraft flight times. This is accomplished by providing a slidable unit that is contained within the interior space of the aircraft lavatory in a storage position and that is extended out of the aircraft lavatory space in a lavatory use position.

DETAILED DESCRIPTION

Figure 1:
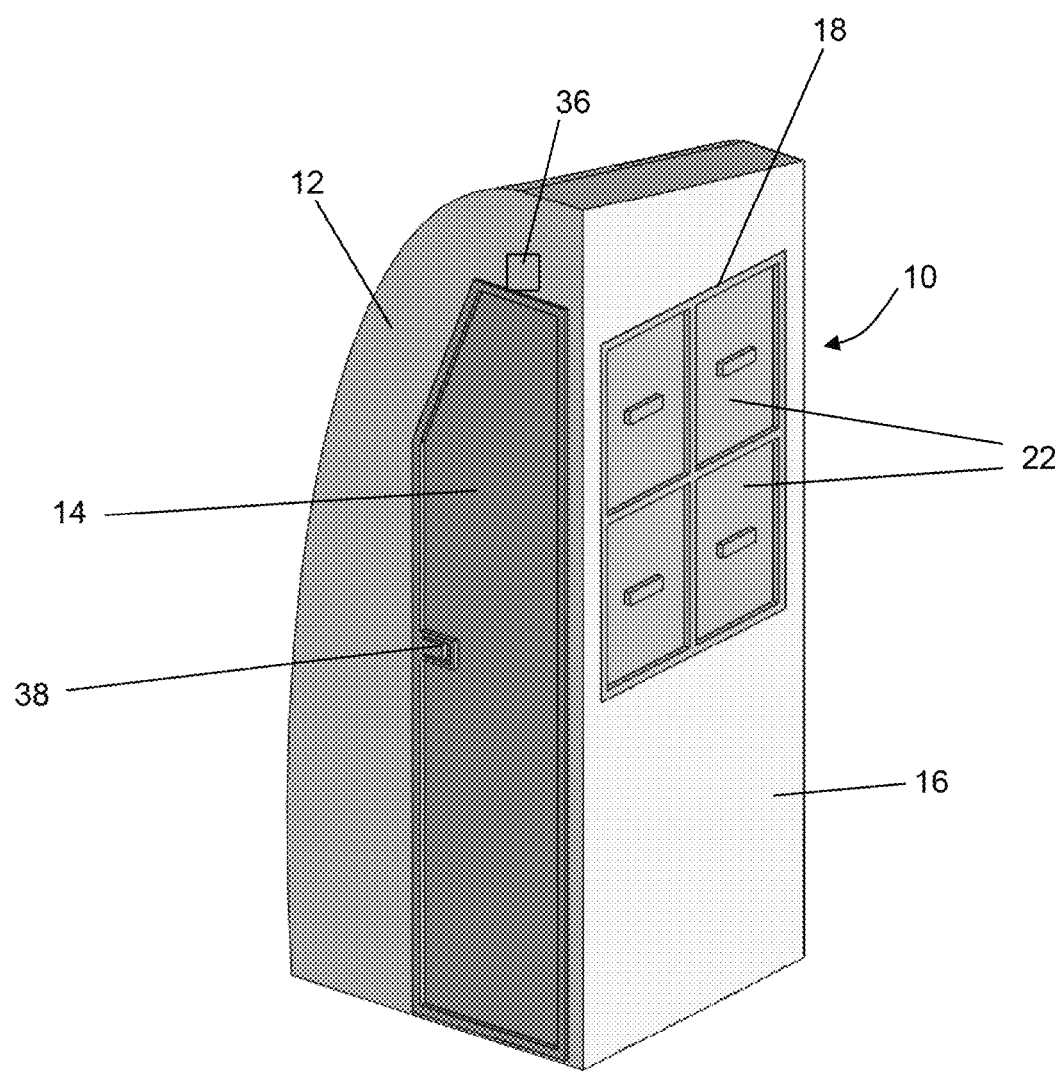
FIG. 1 shows a side perspective view of a slidable unit in a storage position.
Figure 2:
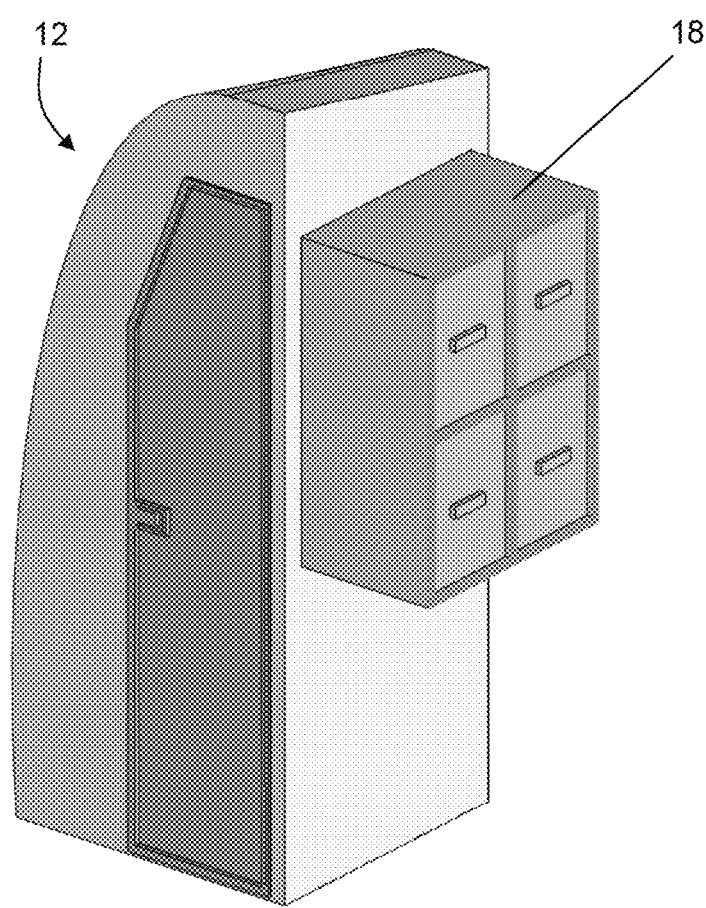
FIG. 2 shows a side perspective view of a slidable unit in a lavatory use position.

Embodiments of the present invention provide an aircraft lavatory storage system 10 that allows the lavatory to be used for storage during times when the lavatory is not in use. As shown in FIG. 1, the lavatory 12 has an access door 14 that is used for entering and exiting the lavatory. It also has a side wall 16, which is a wall that may either be near the entryway into the aircraft, a wall by which passengers and crew may pass, or otherwise a wall that creates a hallway. In any event, there is enough space alongside wall 16 for a person to walk through and by the lavatory 12. FIGS. 1 and 2 show a slidable unit 18 that is designed to slide in and out of sidewall 16. FIG. 1 shows the slidable unit in a closed position, or storage position, such that it extends into the interior space 20 of the lavatory 12 (as shown in the cross sectional view of FIG. 4). FIG. 2 shows the slidable unit 18 in an extended position, or a "lavatory use position," such that it does not extend into the interior space 20 of the lavatory 12 and the lavatory can be used (as shown in the cross sectional view of FIG. 3).

Slidable unit 18 may be formed of or contain one or more storage units 22. The figures show a unit 18 with four storage units 22 in place, but it should be understood that more or fewer storage units 22 may be provided. In one embodiment, the storage units 22 are standardized galley container units that are used for storing items in aircraft galleys and elsewhere on board the aircraft. The units 22 may be installed into a scaffold-like shaped "t" that has storage areas for each unit and such that each storage unit 22 is individually slidable with respect to the unit 18 and/or is removable from the slidable unit 18. Alternatively, the slidable unit 18 itself may be formed from the container units, such that they pull out together, as shown in FIG. 2. Alternatively, the slidable unit 18 may provide a drawer-like base that pulls out collectively, but that allows each storage unit 22 to be accessed individually. The storage units 22 may rotate out and away from the unit 18; they may open from a hinge at the base such that they tilt open/out from the unit 18; they may slide out of the unit from individual housings; they may be drawers that are pulled out from the unit 18 further. The storage units 22 may have separate lids or they may be open boxes. The storage units 22 provide the storage function, or the slidable unit 18 may be one large unit that functions like a large drawer (and may optionally have internal dividers for organization purposes.) A number of options are available and considered within the scope of this invention.

Figure 3:
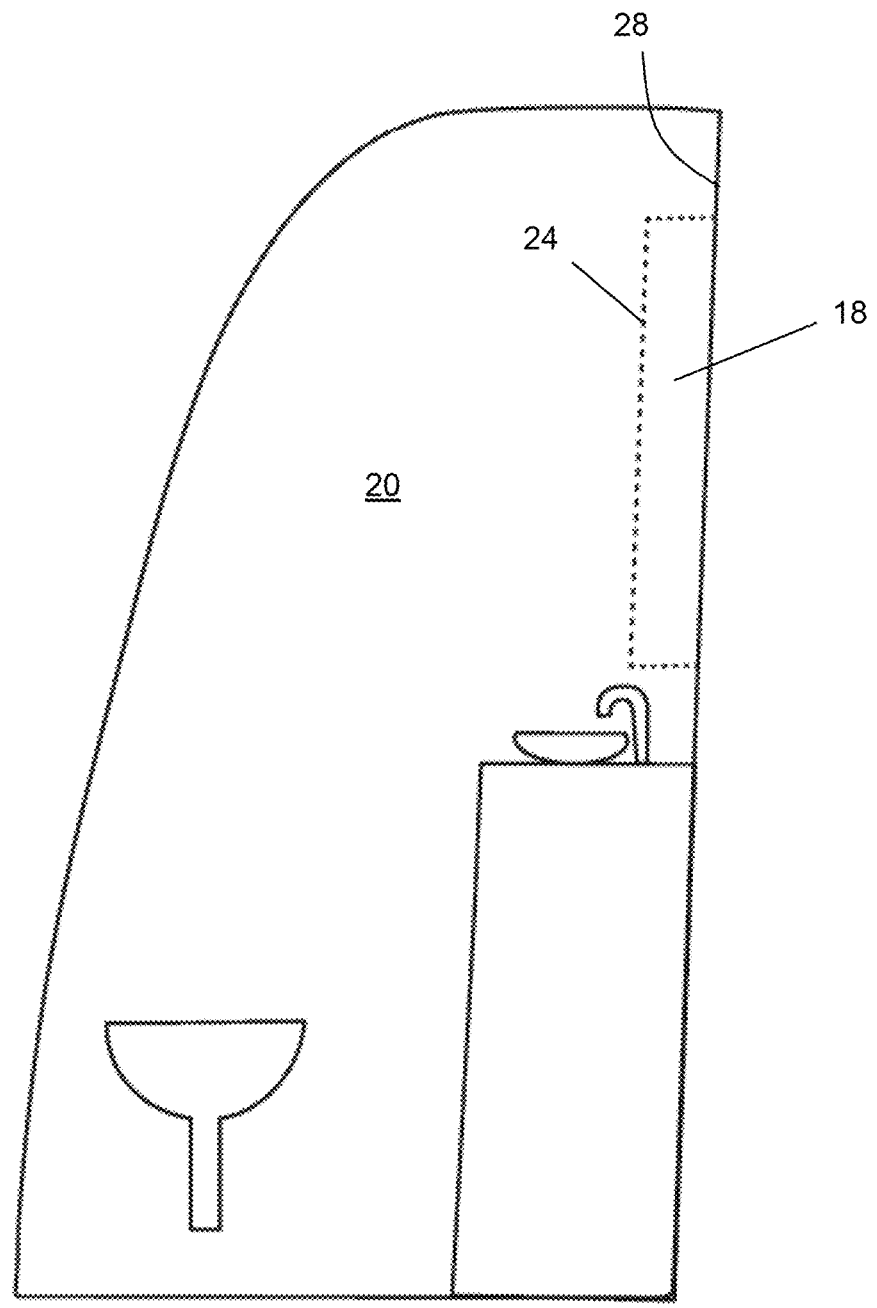
FIG. 3 shows a cross sectional view of a lavatory with a slidable unit in the lavatory use position.

The front of the slidable unit 18 is made up of one or more storage units 22. The rear wall of the slidable unit 18 may actually form the mirror 24 that is positioned over the lavatory sink 26, as shown in FIGS. 2 and 3. When the slidable unit 18 is in the extended/lavatory use position as shown in FIG. 2, a passenger inside the lavatory generally has the same amount of space as usual, and may not even notice a difference from inside the lavatory. The mirror 24/back of the slidable unit 18 may be flush with the lavatory inner wall 28 or it may protrude slightly. The dotted lines in FIG. 3 are intended to illustrate this general variation. There may even be a trim piece around the mirror 24/back of the slidable unit 18 so that the inside of the lavatory has a polished appearance when the slidable unit is extended in the lavatory use position.

In this position, the airline attendants have easy and full access to the storage unit(s) 22 during flight. (However, the storage units 22 may also be accessed when the slidable unit is in the storage position as well, just not from the side, but they may be pulled out as desired.) The storage units 22 may store blankets, extra galley supplies, or any other number of items that may need to be stored and accessed. In the lavatory use positioned, the unit 18 protrudes outwardly. The space it takes up in the extended position is generally an aircraft entrance/exit area, so the blockage is not objectionable during flight when the lavatory 12 is generally in use, because no one needs to enter or exit the aircraft during flight. (That is, unless aircraft evacuation circumstances exist, and in that case, the lavatories would not be in use and the slidable unit 18 would be locked in the storage position so that the entrance/exit passageway is cleared.)

Although not shown, it is possible to design the slidable unit 18 so that once it is extended out, it may rotate on a hinge or other structure that allows side movement of the unit 18 as well. In an alternate embodiment, the unit may be completely removed from the side wall 16 and stored elsewhere if need be, and a wall cover (e.g., with a back mirror) may be positioned in its place.

Figure 4:
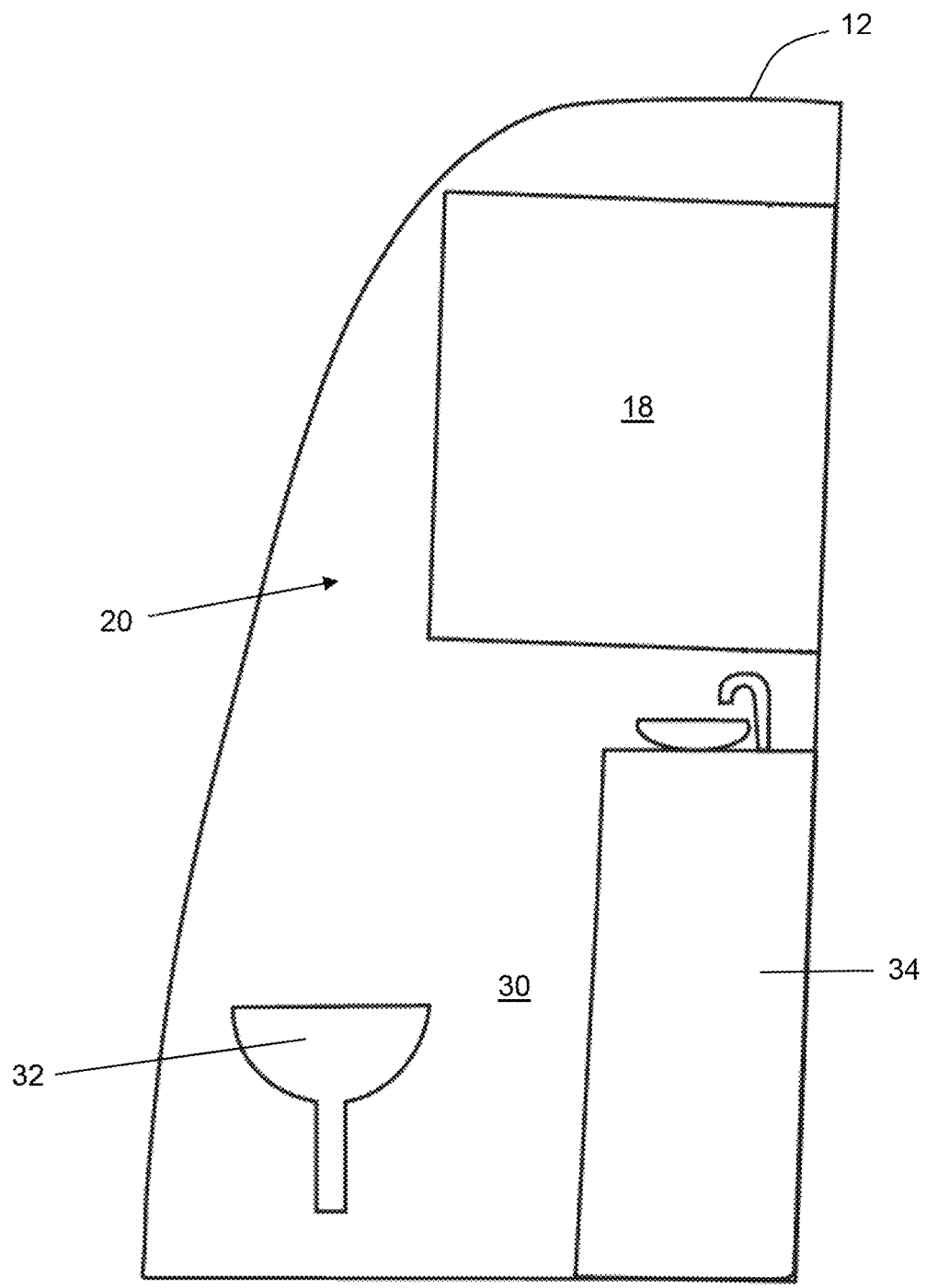
FIG. 4 shows a cross sectional view of a lavatory with a slidable unit in the storage position.

Once the entrance/exit area needs to be used such as for boarding or the de-planing process, the slidable unit 18 can be retracted back into the lavatory, in the storage position. A cross-sectional view of the lavatory with the slidable unit 18 in the storage position is shown in FIG. 4. As shown, the unit 18 takes up a large amount of space in the lavatory, such that the lavatory is inoperable. In this position, the lavatory door 14 can be locked externally to indicate to passengers that this lavatory is not in use. There may be an external lock 36 at the top of the door 14 or the regular door lock 38 may be overridden to lock from the outside rather than from the inside. This can cause an "occupied" light to turn on or sign to show, so that no passengers attempt to enter the lavatory.

FIG. 4 also illustrates that there may also be unused space 30 between the toilet 32 and the sink cabinet 34. If the slidable unit 18 is in the storage position and the lavatory is out of service anyway, this space 30 may be used to store an extra trolley, a small foldable wheelchair, other storage units, or any other items that may need to be temporarily stored when the aircraft is not in flight.

For safety and practical reasons, the slidable unit 18 must reliably lockable in whichever position it is in. Typical aircraft regulations require structures that could become projectiles (coffee maker baskets, trash compactor doors, etc.) to have dual/redundant locks, and it is expected that such regulations would apply to the slidable unit 18. Accordingly, there should generally be two different types of locks provided that maintain the slidable unit 18 in the storage position, as well as two different types of locks provided that maintain the slidable unit 18 in the lavatory use position. These locks may be quarter turn locks, magnetic locks, push push locks, spring locks, key locks, or any other appropriate lock combination that keeps the slidable unit 18 in place.

Changes and modifications, additions and deletions may be made to the structures and methods recited above and shown in the drawings without departing from the scope or spirit of the invention and the following claims.

What is claimed is:

1. An aircraft lavatory storage system, the lavatory comprising an interior space, a lavatory sink cabinet, and an access door, the storage system comprising:
   (a) a slidable unit configured to be (i) contained within the interior space of the aircraft lavatory and above the lavatory sink cabinet in a storage position and (ii) extended out of the aircraft lavatory space in a lavatory use position;
   (b) the slidable unit comprising a back wall that comprises a mirror positioned over the lavatory sink cabinet in the lavatory use position;
   (c) a locking system configured to maintain the slidable unit in place whether in the storage position or the lavatory use position; and
   (d) an external lock on the access door to indicate that the lavatory is unavailable when the slidable unit is in the storage position.

2. The aircraft lavatory storage system of claim 1, wherein the slidable unit comprises one or more storage units.

3. The aircraft lavatory storage system of claim 2, wherein the one or more storage units are individually accessible.

4. The aircraft lavatory storage system of claim 2, wherein the one or more storage units are positioned on drawer-like runners, hinge out from the slidable unit, rotate out of the slidable unit, are completely removable from the slidable unit, or combinations thereof.

5. The aircraft lavatory storage system of claim 1, wherein the locking system comprises a dual/redundant lock system.

6. The aircraft lavatory storage system of claim 1, wherein the slidable unit comprises a drawer-like base out of which one or more slidable storage units are configured to slide.

7. A method for storing items in an aircraft lavatory, comprising:
   (a) providing a slidable unit configured to be contained within an interior space of the aircraft lavatory above a lavatory sink cabinet in a storage position and extended out of the aircraft lavatory space in a lavatory use position, the slidable unit comprising a back wall with a mirror that is positioned over the lavatory sink cabinet when the slidable unit is in the lavatory use position;
   (b) positioning one or more items to be stored in the slidable unit;
   (c) pushing the slidable unit into the lavatory space during taxi, take-off, and landing; and
   (d) extending the slidable unit out of the lavatory interior during flight in order to give access to the lavatory.

8. The method of claim 7, further comprising locking the slidable unit in position.

9. The method of claim 7, wherein the slidable unit contains one or more storage units and wherein the one or more items to be stored are positioned in the one or more storage units.

10. An aircraft lavatory storage system for use with a lavatory comprising an interior space, a lavatory sink cabinet, and an access door, the storage system comprising:
    (a) a slidable unit comprising a plurality of separately accessible storage units, the slidable unit configured to be (i) contained within the interior space of the aircraft lavatory and above the lavatory sink cabinet in a storage position and (ii) extended out of the aircraft lavatory space in a lavatory use position;
    (b) a locking system configured to maintain the slidable unit in place whether in the storage position or the lavatory use position; and
    (d) an external lock on the access door to indicate that the lavatory is unavailable when the slidable unit is in the storage position,
    wherein the plurality of separately accessible storage units may be accessed individually from the sliding unit.

11. The aircraft lavatory storage system of claim 10, wherein the locking system comprises a dual/redundant lock system.

12. The aircraft lavatory storage system of claim 10, wherein the slidable unit comprises a back wall that comprises a mirror.

13. The aircraft lavatory storage system of claim 10, wherein the plurality of separately accessible storage units comprise standardized galley container units.

14. The aircraft lavatory storage system of claim 10, wherein the slidable unit comprises a t-shaped scaffold to house the plurality of separately accessible storage units.

* * * * *